(12) United States Patent
Take et al.

(10) Patent No.: US 12,292,627 B2
(45) Date of Patent: May 6, 2025

(54) OPTICAL DEVICE

(71) Applicant: TDK CORPORATION, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN); Atsushi Shimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 180 days.

(21) Appl. No.: 17/707,675

(22) Filed: Mar. 29, 2022

(65) Prior Publication Data

US 2022/0326555 A1  Oct. 13, 2022

(30) Foreign Application Priority Data

Mar. 30, 2021  (CN) .......................... 202110340343.2
Mar. 24, 2022  (CN) .......................... 202210296419.0

(51) Int. Cl.
| | | |
|---|---|---|
| G02F 1/225 | (2006.01) | |
| G02B 6/12 | (2006.01) | |
| G02B 6/122 | (2006.01) | |
| G02F 1/03 | (2006.01) | |
| G02F 1/035 | (2006.01) | |
| G02F 1/21 | (2006.01) | |

(52) U.S. Cl.
CPC ............. *G02F 1/035* (2013.01); *G02B 6/122* (2013.01); *G02F 1/0305* (2013.01); *G02F 1/212* (2021.01); *G02F 1/225* (2013.01); *G02B 2006/12097* (2013.01); *G02F 2202/20* (2013.01)

(58) Field of Classification Search
CPC .......... G02F 1/035; G02F 1/212; G02F 1/225; G02F 2202/20; G02B 6/122; G02B 2006/12097; G02B 6/1228
See application file for complete search history.

(56) References Cited

U.S. PATENT DOCUMENTS

| | | | |
|---|---|---|---|
| 5,129,017 A | 7/1992 | Kawano et al. | |
| 5,991,489 A * | 11/1999 | Kondo | G02B 6/1342 385/129 |
| 6,532,324 B2 | 3/2003 | Lupu et al. | |
| 7,373,065 B2 * | 5/2008 | Yamaguchi | G02B 6/122 385/129 |
| 8,582,927 B1 | 11/2013 | Thaniyavarn | |
| 9,036,239 B2 * | 5/2015 | Bouvrot | G02F 1/0027 359/279 |

(Continued)

FOREIGN PATENT DOCUMENTS

| | | |
|---|---|---|
| JP | S64-048021 A | 2/1989 |
| JP | H08-016746 B2 | 2/1996 |

(Continued)

OTHER PUBLICATIONS

Machine translation of JP-2014006348-A (Year: 2014).*
Machine translation of WO-2017119313-A1 (Year: 2017).*

*Primary Examiner* — Daniel Petkovsek
*Assistant Examiner* — Emma R. Oxford
(74) *Attorney, Agent, or Firm* — Oliff PLC

(57) ABSTRACT

The optical device includes a substrate and an optical waveguide formed on the substrate, a protrusion portion is formed on the substrate adjacent to the optical waveguide. Accordingly, an optical device which can achieve further suppression of the light propagation loss and higher reliability is provided.

16 Claims, 2 Drawing Sheets

(56) References Cited

U.S. PATENT DOCUMENTS

| | | | |
|---|---|---|---|
| 9,946,100 B2 | 4/2018 | Yanagawa et al. | |
| 2002/0106141 A1 | 8/2002 | Gopalakrishnan | |
| 2003/0012540 A1* | 1/2003 | Kato | B23K 26/364 |
| | | | 359/326 |
| 2004/0028334 A1 | 2/2004 | Marazzi et al. | |
| 2007/0147722 A1* | 6/2007 | Kondo | G02F 1/2255 |
| | | | 385/2 |
| 2007/0189689 A1* | 8/2007 | Yamaguchi | G02F 1/035 |
| | | | 385/129 |
| 2008/0218847 A1* | 9/2008 | Yoshino | G02F 1/3775 |
| | | | 359/326 |
| 2009/0324163 A1* | 12/2009 | Dougherty | G02B 6/1228 |
| | | | 385/14 |
| 2012/0050842 A1* | 3/2012 | Kondo | G02F 1/3775 |
| | | | 359/328 |
| 2015/0147038 A1* | 5/2015 | Asai | G02B 6/122 |
| | | | 385/122 |
| 2017/0052424 A1* | 2/2017 | Iwatsuka | G02B 6/122 |
| 2019/0293972 A1* | 9/2019 | Sasaki | G02B 6/12 |
| 2020/0218126 A1 | 7/2020 | Iwatsuka et al. | |
| 2020/0310170 A1 | 10/2020 | Iwatsuka et al. | |

FOREIGN PATENT DOCUMENTS

| | | | | |
|---|---|---|---|---|
| JP | 3149088 B2 | 3/2001 | | |
| JP | 2004-226471 A | 8/2004 | | |
| JP | 2005-292245 A | 10/2005 | | |
| JP | 2006-195383 A | 7/2006 | | |
| JP | 2006-317550 A | 11/2006 | | |
| JP | 2007-199500 A | 8/2007 | | |
| JP | 4485218 B2 | 6/2010 | | |
| JP | 2012-078375 A | 4/2012 | | |
| JP | 2014006348 A | * | 1/2014 | |
| JP | 2014-142411 A | 8/2014 | | |
| JP | 2015-014715 A | 1/2015 | | |
| JP | 5853880 B2 | 2/2016 | | |
| JP | 2019-074595 A | 5/2019 | | |
| WO | WO-2006122429 A1 | * | 11/2006 | G02B 6/136 |
| WO | WO-2017119313 A1 | * | 7/2017 | |
| WO | 2019/039215 A1 | 2/2019 | | |
| WO | 2019/069815 A1 | 4/2019 | | |

* cited by examiner

OPTICAL DEVICE

FIELD

The present invention relates to an optical device used in the fields of optical communication and optical measurement.

BACKGROUND

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As an optical modulator, an optical modulator using an optical waveguide formed of lithium niobate ($LiNbO_3$, hereinafter referred to as "LN") has the advantages of high speed, low loss and less distortion of controlling light waveform. However, compared with semiconductor optical devices, it has the disadvantages of large driving voltage, large size etc.

In order to overcome the above disadvantages, it is known that an optical modulator with large miniaturization and low driving voltage can be realized by an optical waveguide using a LN film formed by applying thin film technology on a sapphire substrate (see patent documents 1 and 2). In such an optical device, there is a problem that the propagation loss of light increases due to the leakage of the light propagating in the optical waveguide to the side surface. In order to improve the confinement of light propagating in the optical waveguide in the lateral direction, Patent Document 3 discloses that by forming grooves on the adjacent side in the lateral direction of the optical waveguide so as to realize the optical waveguide with strong confinement.

However, an optical device which can achieve further suppression of light propagation loss and higher reliability is desired.

CITATION LIST

Patent Document

Patent Document 1: JP 2006-195383A
Patent Document 2: JP 2014-006348A
Patent Document 3: JP 2005-292245A

SUMMARY

The present invention is the result of intensive research in view of the above problems, and its object is to provide an optical device that can achieve further suppression of the light propagation loss and higher reliability.

The inventors of the present invention have conducted in-depth research on the mechanism of the propagation loss of light, and as a result, they have discovered the following new technical problems that are hard to come up with until now by those skilled in the art: In the above optical device using thin film technology, there are some cases, such as, exposing the LN film to liquid chemicals or pure water, gas or oxygen flow during annealing treatment in the manufacturing process, placing the wafer in liquid, shaking it and hanging it in liquid in the resist stripping process etc. In such cases, the LN film is subjected to external stress, and an optical waveguide defect can occur in the LN film subjected to such a process stress due to stress concentration. Further, due to the optical waveguide defect, the light propagation loss propagating in the optical waveguide can occur. That is, the inventors of the present invention have newly discovered that as the main factor of the light propagation loss, in addition to the leakage of light to the side surface illustrated in Patent Document 3, there is also a stress concentration in the process. Thus, according to the above brand new technical problem, the inventors of the present invention have conducted in-depth research on the structure of the LN film, and as a result, by forming a protrusion portion adjacent to the optical waveguide, and using this protrusion portion to disperse stress, a novel structure that has never been thought of in the technical field of the LN film is discovered until the present invention is completed.

That is, the optical device according to one aspect of the present invention comprises a substrate, and an optical waveguide formed on the substrate, a protrusion portion is formed adjacent to the optical waveguide on the substrate.

In this optical device, by the protrusion portion formed adjacent to the optical waveguide on the substrate, the protrusion portion can be used to disperse stress. Thus, the optical waveguide defect caused by stress concentration can be prevented, and further suppression of the light propagation loss and the further improvement of reliability can be achieved.

In addition, in the above optical device according to one aspect of the present invention, preferably, in the protrusion portion, the slopes of the left and right foothills of the peak are different. In this way, the stress can be dispersed more effectively to prevent the optical waveguide defect.

In addition, in the above optical device according to one aspect of the present invention, preferably, the protrusion portion is formed by intersecting a first side and a second side in a cross section perpendicular to a propagation direction of light.

In addition, in the above optical device according to one aspect of the present invention, preferably, at least one of the first side and the second side is inclining with respect to an upper surface of the substrate.

In addition, in the above optical device according to one aspect of the present invention, preferably, both of the first side and the second side are inclining with respect to an upper surface of the substrate, the slope of the first side is different from the slope of the second side.

In addition, in the above optical device according to one aspect of the present invention, preferably, the second side is parallel with respect to the substrate, or comparing with the first side located closer to a side of the optical waveguide than the second side, the slope of the second side is smaller. In this way, the stress can be dispersed more effectively to prevent the optical waveguide defect.

In addition, in the above optical device according to one aspect of the present invention, preferably, a peak of the protrusion portion is separated from a side surface of the optical waveguide by a distance of 40% to 150% of the height of the optical waveguide. In this way, the stress can be dispersed more effectively to prevent the optical waveguide defect.

In addition, in the above optical device according to one aspect of the present invention, preferably, a height of a peak of the protrusion portion is 5% to 100% of the height of the optical waveguide. In this way, the stress can be dispersed more effectively to prevent the optical waveguide defect.

In addition, in the above optical device according to one aspect of the present invention, preferably, the optical waveguide is a film composed of $LiNbO_3$ or $LiTaO_3$.

In addition, in the above optical device according to one aspect of the present invention, preferably, the optical waveguide is a film formed by doping $LiNbO_3$ with at least one element selected from Ti, Mg, Zn, In, Sc, Er, Tm, Yb and Lu.

In addition, in the above optical device according to one aspect of the present invention, preferably, the optical waveguide is an epitaxial film.

In addition, in the above optical device according to one aspect of the present invention, preferably, the epitaxial film is oriented along a direction intersecting with the substrate.

An optical modulator according to another aspect of the present invention comprises a substrate, and an optical waveguide formed on the substrate, a protrusion portion is formed adjacent to the optical waveguide on the substrate.

According to one aspect of the present invention, an optical device which can achieve further suppression of the light propagation loss and higher reliability is provided.

BRIEF DESCRIPTION OF THE DRAWINGS

FIG. 1(b) illustrates the whole body of the optical modulator including traveling wave electrodes.

DETAILED DESCRIPTION OF THE EMBODIMENT(S)

Hereinafter, preferable embodiments of the present invention will be described in detail with reference to the accompanying drawings. Herein, in the description of the accompanying drawings, the same or equivalent elements are marked with the same symbols, and repeated descriptions are omitted.

Figure 1A:
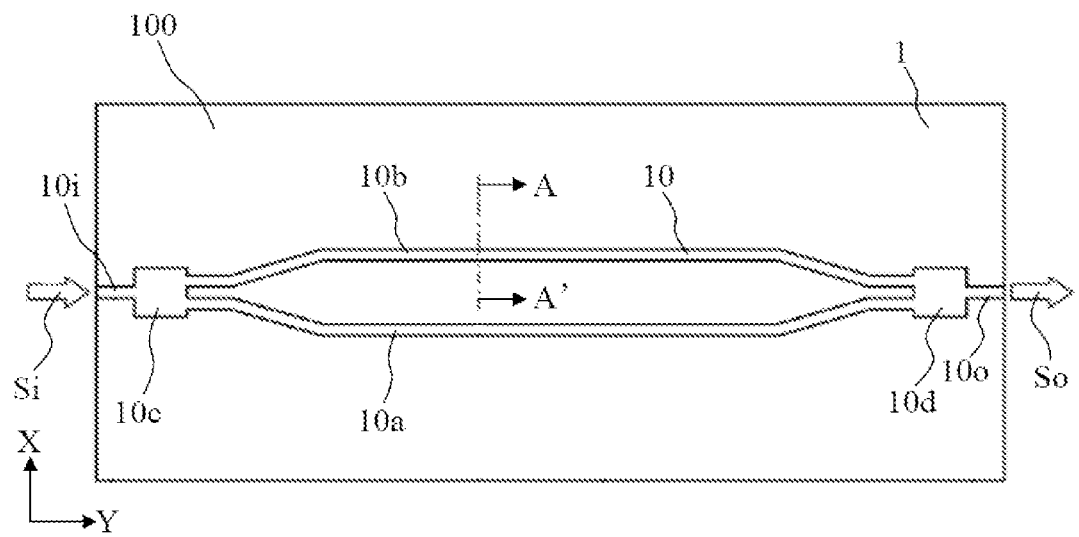
FIG. 1(a) and FIG. 1(b) are top views of optical modulator 100 according to the first embodiment of the present invention, and FIG. 1(a) only illustrates the optical waveguide.
Figure 1B:
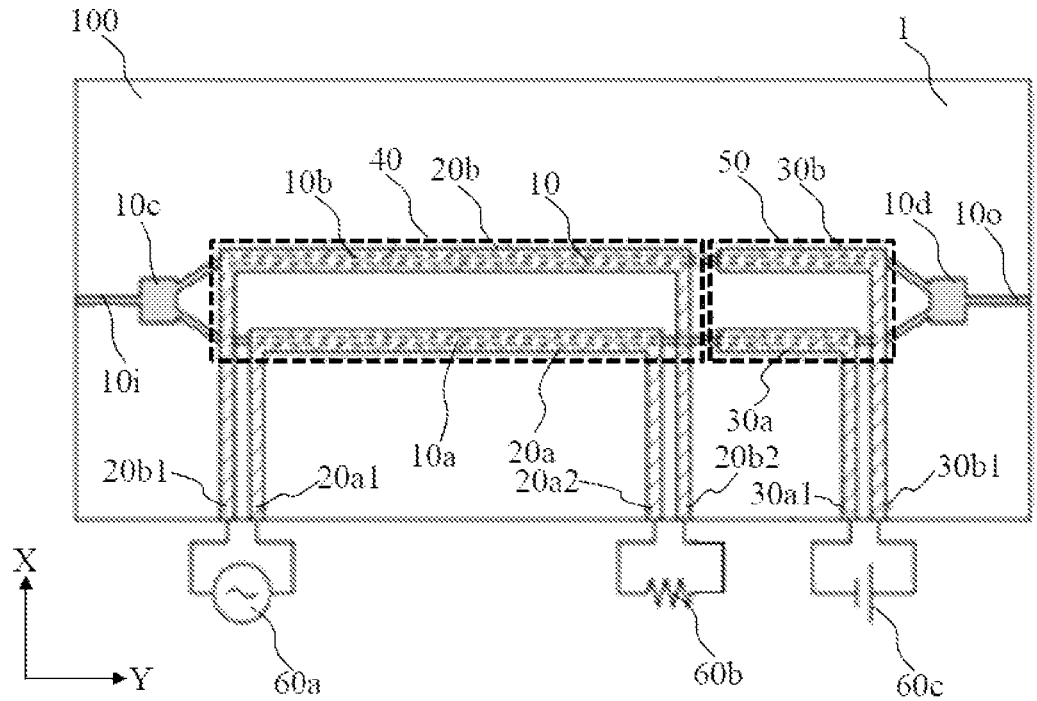

FIG. 1(a) and FIG. 1(b) are top views of an optical modulator 100 according to the first embodiment of the present invention, FIG. 1(a) only illustrates the optical waveguide, and FIG. 1(b) illustrates the whole body of the optical modulator including the traveling wave electrode. As illustrated in FIG. 1(a) and FIG. 1(b), optical modulator 100 which is as an optical device comprises: Mach-Zehnder optical waveguide 10 which has first and second optical waveguides 10a and 10b formed on substrate 1 and arranged parallel to each other, a first signal electrode 20a arranged along first optical waveguide 10a, a second signal electrode 20b arranged along second optical waveguide 10b, first bias electrode 30a arranged along first optical waveguide 10a and second bias electrode 30b arranged along second optical waveguide 10b. First signal electrode 20a and second signal electrode 20b together with first optical waveguide 10a and second optical waveguide 10b constitute RF interaction portion 40 of the Mach-Zehnder optical modulator. First bias electrode 30a and second bias electrode 30b together with first optical waveguide 10a and second optical waveguide 10b constitute DC interaction portion 50 of the Mach-Zehnder optical modulator.

Mach-Zehnder optical waveguides 10 are optical waveguides having a structure of Mach-Zehnder interferometer. There are first and second optical waveguides 10a and 10b branched from one input optical waveguide 10i by branch portion 10c, and first and second optical waveguides 10a and 10b are converged in one output optical waveguide 10o via multiplexing portion 10d. After input light Si is branched in branch portion 10c and travels through first and second optical waveguides 10a and 10b, it is multiplexed in multiplexing portion 10d and output from output optical waveguide 10o as modulation light So.

First and second signal electrodes 20a, 20b are linear electrode patterns overlapping first and second waveguides 10a, 10b in the plan view, and both ends thereof extend to electrode pads provided near the end face of substrate 1. That is, one ends 20a1 and 20b1 of first signal electrode 20a and second signal electrode 20b are drawn out to electrode pads provided near the end face of substrate 1 to form a signal input port, and driving circuit 60a is connected to the signal input port. Further, the other ends 20a2 and 20b2 of first signal electrode 20a and second signal electrode 20b are drawn out to electrode pads provided near the end face of substrate 1 and are connected to each other via a terminating resistor 60b. Thus, first and second signal electrodes 20a and 20b function as differential coplanar traveling wave electrodes.

First and second bias electrodes 30a and 30b are independent of first and second signal electrodes 20a and 20b in order to apply a DC voltage (DC bias voltage) to first and second waveguides 10a and 10b. One ends 30a1 and 30b1 of first bias electrode 30a and second bias electrode 30b are drawn out to electrode pads provided near the end face of substrate 1 to form a DC bias voltage input port, and bias circuit 60c is connected to the DC bias port. In the present embodiment, the formation regions of first bias electrode 30a and second bias electrode 30b are disposed closer to the side of the output end of Mach-Zehnder optical waveguide 10 than the formation regions of first signal electrode 20a and second signal electrode 20b. However, it can also be provided on the input side.

As described above, first and second signal electrodes 20a and 20b apply the RF signal to first and second waveguides 10a and 10b, and first and second bias electrodes 30a and 30b apply the DC bias voltage to first and second waveguides 10a and 10b.

The differential signal (the modulation signal) having the same absolute value but different positive and negative is input to one ends of first and second signal electrodes 20a, 20b. Since first and second optical waveguides 10a and 10b are formed of materials with electro-optical effects such as lithium niobate, according to the electric field imparted to first and second optical waveguides 10a and 10b, the refractive index of first and second optical waveguides 10a and 10b changes as $+\Delta n$ and $-\Delta n$ respectively, and the phase difference between a pair of optical waveguides 10a and 10b changes. The signal light modulated by the change of the phase difference is output from output optical waveguide 10o.

In this embodiment, first and second optical waveguides 10a and 10b are films composed of $LiNbO_3$, but are not limited to this. First and second optical waveguides 10a and 10b can also be films composed of $LiTaO_3$ or films formed doping LiNbO$_3$ with at least one element selected from Ti, Mg, Zn, In, Sc, Er, Tm, Yb and Lu.

In this embodiment, first and second optical waveguides 10a and 10b are epitaxial films. Preferably, the epitaxial film is oriented along a direction intersecting with substrate 1.

Figure 2:
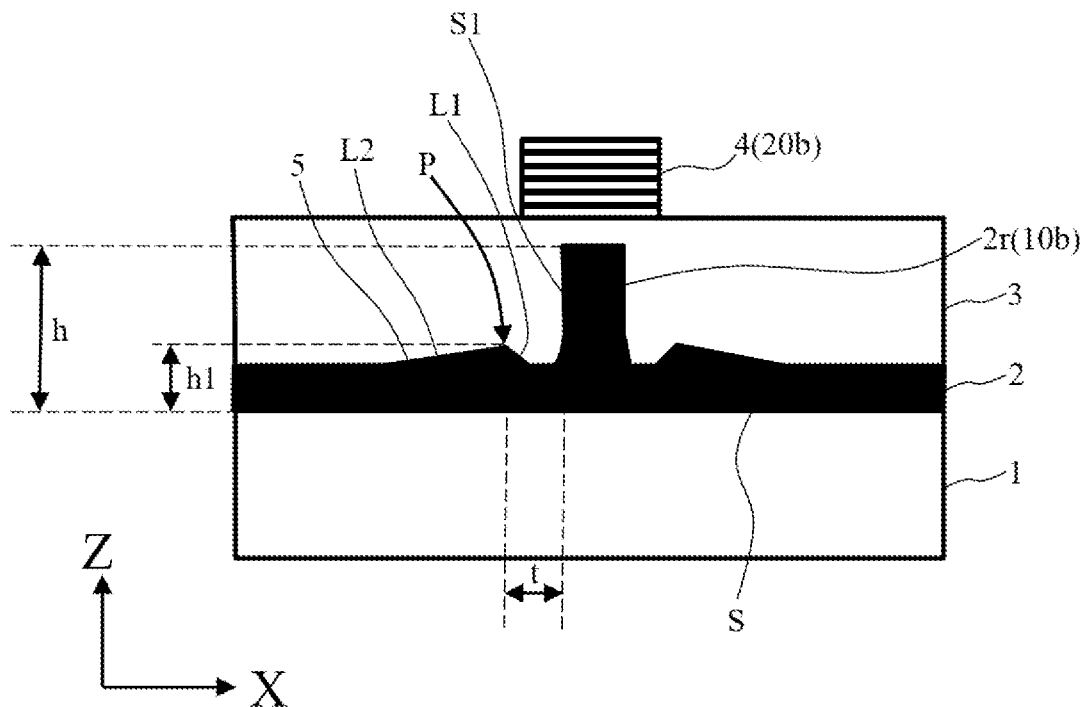
FIG. 2 is a cross-sectional view of optical modulator 100 according to the embodiment of the present invention taken along line A-A'.

FIG. 2 is a cross-sectional view according to the embodiment of the present invention taken along line A-A'. As shown in FIG. 2, optical modulator 100 has a multilayer structure in which substrate 1, waveguide layer 2, buffer layer 3 and electrode layer 4 are laminated in this order. Substrate 1 is, for example, a sapphire substrate. Waveguide layer 2 made of electro-optical material represented by lithium niobate (LiNbO$_3$, hereinafter, referred to as "LN") is formed on the surface of substrate 1. Waveguide layer 2 has optical waveguide 10b composed of ridge portion 2r. In FIG. 2, only optical waveguide 10b is illustrated, but the structures of optical waveguide 10a, the protrusion portion formed adjacent to optical waveguide 10a etc. are the same as the structures of optical waveguide 10b. Thus, their illustration and description are omitted herein.

In addition, on substrate 1, protrusion portion 5 is formed along optical waveguide 10b. Protrusion portion 5 is formed on substrate 1 adjacent to optical waveguide 10b.

The so-called protrusion portion 5 can be any one of the cases in which the periphery becomes higher and becomes a peak shape, or the periphery is dug down and becomes a peak shape. The final form is preferably configured in its cross section corresponding to the height of the optical waveguide without being too high. In addition, the vertex of its peak is not far from the optical waveguide.

In this embodiment, in protrusion portion 5, the slopes of the left and right foothills of the peak are different. Specifically, protrusion portion 5 is formed by crossing first side L1 and second side L2 inclined at different slopes with respect to upper surface S of substrate 1 in a cross section perpendicular to the propagation direction of light (i.e., the section shown in FIG. 2). First side L1 and second side L2 intersect at peak P of protrusion portion 5, first side L1 extends to upper surface S of substrate 1, and second side L2 extends to upper surface S of substrate 1.

In this embodiment, protrusion portion 5 obtained by crossing first side L1 and second side L2 becomes a sharp peak, but is not limited to this. There are also cases where the peak is round and the peak becomes flat.

In this embodiment, both of first side L1 and second side L2 are inclined with respect to upper surface S of substrate 1, but are not limited to this. As long as at least one of first side L1 and second side L2 is inclined with respect to upper surface S of substrate 1, for example, first side L1 may be inclined with respect to upper surface S of substrate 1, and second side L2 may be parallel with respect to substrate 1.

In this optical modulator, by the protrusion portion formed on the substrate adjacent to the optical waveguide, it is possible to disperse the stress by the protrusion portion. Thereby, the optical waveguide defect due to stress concentration is prevented, and further suppression of the light propagation loss and further improvement of reliability can be achieved.

In addition, in the present embodiment, preferably, the slopes of first side L1 and second side L2 are different. However, it is not limited to this, and the slopes of first side L1 and second side L2 can also be the same.

In addition, when the slopes of first side L1 and second side L2 are different, preferably, comparing with first side L1 located closer to optical waveguide 10b than second side L2, second side L2 has a smaller slope. In this way, the stress can be dispersed more effectively to prevent the optical waveguide defect.

In addition, in the present embodiment, preferably, peak P of protrusion portion 5 is separated from side surface S1 of optical waveguide 10b by a distance t of 40% to 150% of the height h of optical waveguide 10b. In this way, the stress can be dispersed more effectively to prevent the optical waveguide defect. In addition, the height h of optical waveguide 10B is a rising height from the bottom. The bottom is set as a point measured from the surface of substrate 1 at the opposite side of the side forming optical waveguide 10b and equivalent to the shortest distance.

In addition, as an example, there is no special limit, but t can be designed in the range of 0.1-3 μm and h can be designed in the range of 0.1-2 μm.

In addition, in the present embodiment, preferably, the height h1 of peak P of protrusion portion 5 is preferably 5% to 100% of the height h of optical waveguide 10b. In this way, the stress can be dispersed more effectively to prevent the optical waveguide defect.

Buffer layer 3 is a layer formed on substrate 1 by covering the entire surface of the region where ridge portion 2r is not formed on the upper surface of waveguide layer 2 and the side surface and the upper surface of ridge portion 2r so as to prevent the light propagating in optical waveguides 10a and 10b from being absorbed by electrodes 20a and 20b. Buffer layer 3 only needs to function as an intermediate layer between the optical waveguide and the electrode, and the material of buffer layer 3 can be widely selected as long as it is a non-metal. For example, buffer layer 3 can use a ceramic layer composed of insulating materials such as metal oxides, metal nitrides and metal carbides. The material of buffer layer 3 can be a crystalline material or an amorphous material. Buffer layer 3 is preferably formed of a material with a lower refractive index and higher transparency than waveguide layer 2. For example, Al$_2$O$_3$, SiO$_2$, LaAlO$_3$, LaYO$_3$, ZnO, HfO$_2$, MgO, Y$_2$O$_3$ etc. can be used. The thickness of the buffer layer formed on the optical waveguide can be about 0.2 to 1.2 μm. In the present embodiment, buffer layer 3 not only covers the upper surfaces of optical waveguides 10a and 10b, but also covers the entire surface of the region where ridge portion 2r is not formed in the upper surface of waveguide layer 2 and the side surface of ridge portion 2r. However, as long as buffer layer 3 is formed at least on the upper surface of ridge portion 2r of waveguide layer 2, and buffer layer 3 can also be patterned by selectively only covering the vicinity of the upper surface of optical waveguides 10a and 10b.

In order to reduce the light absorption of the electrode, the film thickness of buffer layer 3 can be as large as possible, and in order to apply a high electric field to optical waveguides 10a and 10b, the film thickness of buffer layer 3 can be as small as possible. Since the light absorption of the electrode and the applied voltage of the electrode are trade-off, it is necessary to set an appropriate film thickness according to the purpose. The higher the dielectric constant of buffer layer 3, the more Vx (V) as an indicator of electric field efficiency can be reduced. Therefore, it is preferable. The lower the refractive index is, the thinner buffer layer 3 can be. Therefore, it is preferable. Generally, because the refractive index of the material with a high dielectric constant is also high, considering the balance between the two, it is important to select a material with a high dielectric constant and a relatively low refractive index. As an example, Al$_2$O$_3$ has a relative dielectric constant of about 9 and a refractive index of about 1.6, which is a preferable material. LaAlO$_3$ has a relative dielectric constant of about 13 and a refractive index of about 1.7, and additionally, LaYO$_3$ has a relative dielectric constant of about 17 and a refractive index of about 1.7, which is a particularly preferable material.

Electrode layer 4 is arranged on buffer layer 3. Electrode layer 4 is provided with first and second signal electrodes 20a and 20b and first and second bias electrodes 30a and 30b. First and second signal electrodes 20a and 20b and first and second bias electrodes 30a and 30b are provided overlapping ridge portion 2r corresponding to first and the second optical waveguides 10a and 10b respectively, and are opposite to first and second optical waveguides 10a and 10b via buffer layer 3. In FIG. 2, only electrode 20b provided to overlap ridge portion 2r corresponding to optical waveguide 10b and opposed to optical waveguide 10b via buffer layer 3 is shown.

Waveguide layer 2 is not particularly limited as long as it is formed of electro-optical materials, but it is preferable to be formed of lithium niobate (LiNbO$_3$). This is because lithium niobate has a large electro-optical constant and is suitable as a constituent material of optical devices such as optical modulators. Hereinafter, the structure of the present embodiment when the waveguide layer 2 is a lithium niobate film is described in detail.

Substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has triple symmetry, it is preferable that the single crystal substrate of the base also has the same symmetry. Thus, the single-crystal sapphire substrate preferably has a c-plane, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by 2θ-θ X-ray diffraction and second confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002) and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since LiNbO$_3$ has a trigonal crystal system, single-crystal LiNbO$_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of Li$_x$NbA$_y$O$_z$. A denotes an element other than Li, Nb and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, Ce etc., alone or in combination.

The lithium niobate film preferably has a thickness of equal to or smaller than 2 μm. This is because a high-quality lithium niobate film having a thickness larger than 2 μm is difficult to form. The lithium niobate film having an excessively small thickness cannot completely confine light, allowing light to leak to the substrate 1 or the buffer layer 3. Even if an electric field is applied to the lithium niobate film, there is also a concern that the change in the effective refractive index of the first and the second optical waveguides 10a and 10b becomes smaller. Thus, the lithium niobate film preferably has a thickness that is at least approximately one-tenth of the wavelength of light to be used.

It is desirable to form the lithium niobate film by a film forming method such as sputtering, CVD or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. For example, if the cladding layer (not shown) is made of Y$_2$O$_3$, a lithium niobate film of high quality can be formed.

As a formation method for the lithium niobate film, there is known a method of thinly polishing or slicing the lithium niobate single crystal substrate. This method is advantageous in that the same characteristics as the single crystal can be obtained and can be applied to the present invention.
(Modification of the First Embodiment)

Figure 3:
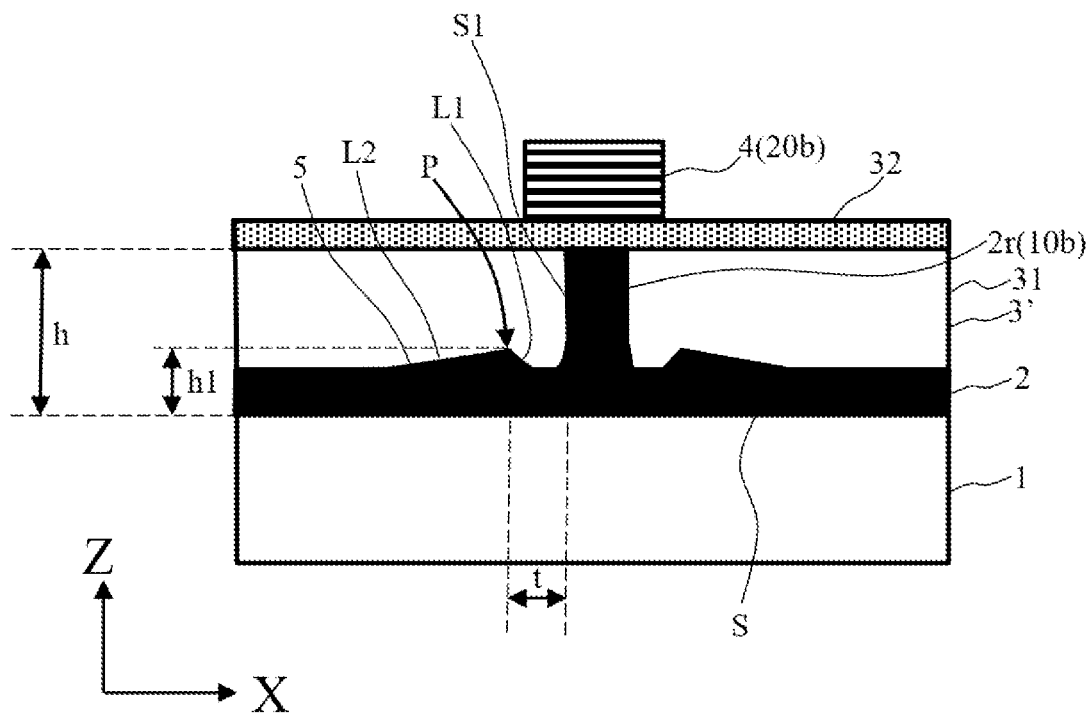
FIG. 3 is a cross-sectional view corresponding to FIG. 2 according to a modification of the first embodiment of the present invention.

FIG. 3 is a cross-sectional view according to a modification of the first embodiment of the present invention corresponding to FIG. 2. In the first embodiment, the example, that the upper surface and the side surface of ridge portion 2r are covered with buffer layer 3 made of the same material, is given. However, it is not limited to this. The material of the buffer layer covering the upper surface of ridge portion 2r can also be different from the material of the buffer layer covering the side surface of ridge portion 2r as shown in FIG. 3.

That is, as illustrated in FIG. 3, buffer layer 3' according to this modification includes first buffer layer 31 and second buffer layer 32. First buffer layer 31 is formed between ridge portion 2r and on the upper surface of waveguide 2. Second buffer layer 32 is formed on the upper surface of first buffer layer 31 and the upper surface of ridge portion 2r. The material of first buffer layer 31 is different from the material of second buffer layer 32. In this way, further suppression of the light propagation loss and further improvement of reliability can be achieved more effectively by making the material of the first buffer layer and the material of the second buffer layer different from each other.

EXAMPLES

Optical modulators provided with optical waveguides of examples 1-11 in which the protrusion portion is formed as the above embodiment and optical modulators provided with optical waveguides of a comparative example 1 in which the protrusion portion is not formed are produced respectively, and their failure rate of optical waveguides are measured, and the result is shown in Table 1. In Table 1, the ratio of the distance t of peak P of protrusion portion 5 from side surface S1 of optical waveguide 10b and the height h of optical waveguide 10B is set to "t/h", the ratio of the height h1 of peak P of protrusion portion 5 and the height h of optical waveguide 10b is set to "h1/h", and the ratio of the height h1 of peak P of protrusion portion 5 and the distance t of peak P of protrusion part 5 from side surface S1 of optical waveguide 10b is set to "h1/t". In addition, the ratio expressed in t/h and h1/h in Table 1 is expressed in % (percentage), and the failure rate of optical waveguide is also expressed in % (percentage).

materials such as barium titanate, lead zirconate titanate etc. In addition, Semiconductor materials, polymer materials etc. with electro-optical effect can also be used as waveguide layer 2.

In addition, in the above embodiment, a pair of optical waveguides 10a and 10b are given. However, as long as the function of optical communication or optical measurement can be achieved, only one optical waveguide can be provided, or three or more optical waveguides can be also provided.

In addition, in the above embodiment, an example, that the present invention is applied to the optical modulator provided with electrodes (first and second signal electrodes 20a and 20b and first and second bias electrodes 30a and 30b), is given, but the electrode is not necessary. As long as it is a structure in which the protrusion portion is formed adjacent to the optical waveguide on the substrate, the present invention can be also applied to devices without electrodes.

In addition, in the above embodiment, in the drawings, it is illustrated that ridge portion 2r is formed vertically, but it is not limited to this. Ridge portion 2r can also be overhang or inverted trapezoidal, and there can also be concavities and convexities on the side surface of ridge portion 2r. Preferably, there are nanoscale fine concavities and convexities or rib-like concavities and convexities formed by film patterning on the side surface of ridge portion 2r.

TABLE 1

| | protrusion portion | t | h | h1 | t/h | h1/h | h1/t | the failure rate of optical waveguide |
|---|---|---|---|---|---|---|---|---|
| Example1 | YES | 0.48 | 1.60 | 0.56 | 30% | 35% | 1.17 | 7.6% |
| Example2 | YES | 0.31 | 1.40 | 0.28 | 22% | 20% | 0.91 | 7.2% |
| Example3 | YES | 0.54 | 1.80 | 0.04 | 30% | 2% | 0.07 | 10.5% |
| Example4 | YES | 0.84 | 1.40 | 0.04 | 60% | 3% | 0.05 | 9.8% |
| Example5 | YES | 1.35 | 1.80 | 0.36 | 75% | 20% | 0.27 | 2.6% |
| Example6 | YES | 0.15 | 0.30 | 0.11 | 50% | 35% | 0.70 | 1.1% |
| Example7 | YES | 1.40 | 1.40 | 0.63 | 100% | 45% | 0.45 | 1.8% |
| Example8 | YES | 0.36 | 0.90 | 0.18 | 40% | 20% | 0.50 | 1.7% |
| Example9 | YES | 0.60 | 0.40 | 0.32 | 150% | 80% | 0.53 | 1.6% |
| Example10 | YES | 0.70 | 1.40 | 0.07 | 50% | 5% | 0.10 | 4.3% |
| Example11 | YES | 0.96 | 1.60 | 0.08 | 60% | 5% | 0.08 | 4.5% |
| Comparative example 1 | NO | — | — | — | — | — | — | 15% |

According to Table 1 above, by forming the protrusion portion adjacent to the optical waveguide on the substrate, this protrusion portion can be used to disperse stress to prevent the optical waveguide defect due to stress concentration and reduce the failure rate of optical waveguides, and further suppression of the light propagation loss and further improvement of reliability can be achieved. In particular, according to the results in Table 1, the ratio of h1 and t is preferably h1/t=0.05-1.17. More preferably, it can be designed within 0.08-0.7, further preferably within 0.27-0.7, and most preferably within 0.45-0.7.

The preferable embodiment of the present invention is illustrated above, but the present invention is not limited to the above embodiment, and various changes can be made without departing from the gist of the present invention, and they are also included in the scope of the present invention.

For example, in the above embodiment, an optical modulator provided with a pair of optical waveguides 10a and 10b formed of the lithium niobate film epitaxially grown on the substrate 1 is given. However, the present invention is not limited to this structure, and it may be an optical modulator in which the optical waveguide is formed of electro-optical Especially in the case of forming the buffer layer, the presence of concavities and convexities is preferred because the reliability can be improved by improving its adhesion.

As specific examples to which the present invention can be applied, any optical device which is capable of achieving optical communication or optical measurement such as optical switches, optical resonators, optical branch circuits, sensor elements, millimeter wave generators etc., can be given.

The invention claimed is:
1. An optical device comprising:
a substrate;
an optical waveguide formed on the substrate; and
a protrusion portion formed adjacent to the optical waveguide on the substrate, wherein in a cross section perpendicular to a propagation direction of light:
the protrusion portion includes a first side that faces the optical waveguide and a second side that faces away from the optical waveguide with a top end of the first side and a top end of the second side intersecting at a peak, the first side slopes downward from the peak toward the optical waveguide and the second side slopes downward from the peak away from the optical waveguide, and an incline of a slope of the second side with respect to an upper surface of the substrate is smaller than an incline of a slope of the first side with respect to the upper surface of the substrate, wherein the peak of the protrusion portion is separated from a side surface of the optical waveguide by a distance of 40% to 60% of a height of the optical waveguide, wherein a height of the peak of the protrusion portion is 5% to 35% of the height of the optical waveguide, and wherein a ratio of the height of the peak of the protrusion portion to the distance that the peak of the protrusion portion is separated from the side surface of the optical waveguide is between 0.08 and 0.70.

2. The optical device according to claim 1, wherein the optical waveguide is a film composed of $LiNbO_3$ or $LiTaO_3$.

3. The optical device according to claim 1, wherein the optical waveguide is a film formed by doping $LiNbO_3$ with at least one element selected from Ti, Mg, Zn, In, Sc, Er, Tm, Yb and Lu.

4. The optical device according to claim 1, wherein the optical waveguide is an epitaxial film.

5. The optical device according to claim 1, wherein the distance that the peak of the protrusion portion is separated from the side surface of the optical waveguide is between 0.15 μm and 0.96 μm.

6. The optical device according to claim 1, wherein the height of the optical waveguide is between 0.30 μm and 1.60 μm.

7. The optical device according to claim 1, wherein the height of the peak of the protrusion portion is between 0.07 μm and 0.18 μm.

8. The optical device according to claim 1, wherein:
the distance that the peak of the protrusion portion is separated from the side surface of the optical waveguide is between 0.15 μm and 0.96 μm,
the height of the optical waveguide is between 0.30 μm and 1.60 μm, and
the height of the peak of the protrusion portion is between 0.07 μm and 0.18 μm.

9. An optical device comprising:
a substrate;
an optical waveguide formed on the substrate; and
a protrusion portion formed adjacent to the optical waveguide on the substrate, wherein in a cross section perpendicular to a propagation direction of light:
the protrusion portion includes a first side that faces the optical waveguide and a second side that faces away from the optical waveguide with a top end of the first side and a top end of the second side intersecting at a peak,
the first side slopes downward from the peak toward the optical waveguide and the second side slopes downward from the peak away from the optical waveguide, and
an incline of a slope of the second side with respect to an upper surface of the substrate is smaller than an incline of a slope of the first side with respect to the upper surface of the substrate,
wherein the peak of the protrusion portion is separated from a side surface of the optical waveguide by a distance of 75% to 150% of a height of the optical waveguide,
wherein a height of the peak of the protrusion portion is 20% to 80% of the height of the optical waveguide, and
wherein a ratio of the height of the peak of the protrusion portion to the distance that the peak of the protrusion portion is separated from the side surface of the optical waveguide is between 0.27 and 0.53.

10. The optical device according to claim 9, wherein the distance that the peak of the protrusion portion is separated from the side surface of the optical waveguide is between 0.60 μm and 1.40 μm.

11. The optical device according to claim 9, wherein the height of the optical waveguide is between 0.40 μm and 1.80 μm.

12. The optical device according to claim 9, wherein the height of the peak of the protrusion portion is between 0.32 μm and 0.63 μm.

13. The optical device according to claim 9, wherein:
the distance that the peak of the protrusion portion is separated from the side surface of the optical waveguide is between 0.60 μm and 1.40 μm,
the height of the optical waveguide is between 0.40 μm and 1.80 μm, and
the height of the peak of the protrusion portion is between 0.32 μm and 0.63 μm.

14. The optical device according to claim 9, wherein the optical waveguide is a film composed of $LiNbO_3$ or $LiTaO_3$.

15. The optical device according to claim 9, wherein the optical waveguide is a film formed by doping $LiNbO_3$ with at least one element selected from Ti, Mg, Zn, In, Sc, Er, Tm, Yb and Lu.

16. The optical device according to claim 9, wherein the optical waveguide is an epitaxial film.

* * * * *